United States Patent
Koumpan et al.

(10) Patent No.: US 10,601,752 B2
(45) Date of Patent: Mar. 24, 2020

(54) RESPONDING TO AN ELECTRONIC MESSAGE COMMUNICATED TO A LARGE AUDIENCE

(71) Applicant: International Business Machines Corporation, Armonk, NY (US)

(72) Inventors: Elezaveta Koumpan, Stoney Creek (CA); Jenny S. Li, Southbury, CT (US); Amit A. Nanavati, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 505 days.

(21) Appl. No.: 15/397,077

(22) Filed: Jan. 3, 2017

(65) Prior Publication Data

US 2018/0191657 A1    Jul. 5, 2018

(51) Int. Cl.
*H04L 12/58*    (2006.01)
*G06Q 30/02*    (2012.01)
(Continued)

(52) U.S. Cl.
CPC ............ *H04L 51/14* (2013.01); *G06F 17/279* (2013.01); *G06Q 30/0243* (2013.01);
(Continued)

(58) Field of Classification Search
CPC .............. G06F 17/2785; G06F 17/279; G06Q 30/0242; G06Q 30/0243; G06Q 30/0246; G06Q 50/01; H04L 51/14; H04L 51/32
See application file for complete search history.

(56) References Cited

U.S. PATENT DOCUMENTS 8,073,915 B1 * 12/2011 Nandy .................... H04L 51/12
                                                          709/206
8,126,977 B2 *  2/2012 Mittelstaedt ......... G06Q 10/107
                                                          709/205

(Continued)

FOREIGN PATENT DOCUMENTS

CN      105468681 A    4/2016
WO    2010127150 A2   11/2010
WO    2013040076 A1    3/2013

OTHER PUBLICATIONS

April Mara Barton. "Application of Cascade Theory to Online Systems: A Study of Email and Google Cascades", 10 Minn. J.L. Sci. & Tech. 473 (2009), 31 pages. (Year: 2009).*

(Continued)

*Primary Examiner* — George C Neurauter, Jr.
(74) *Attorney, Agent, or Firm* — Cuenot, Forsythe & Kim, LLC

(57) ABSTRACT

A first electronic message being widely disseminated can be identified. First content of the first electronic message can be analyzed and a determination can be made as to whether the first content satisfies at least a first criterion. Responsive to determining that the first content satisfies at least the first criterion, a second electronic message including second content can be automatically generated. Communication of the second electronic message to a first set of people can be initiated, and responses by the first set of people to the second electronic message can be monitored. A determination can be made as to whether the responses satisfy at least a second criterion. Responsive to determining that the responses satisfy at least the second criterion, the second electronic message can be communicated to at least a second set of people.

20 Claims, 4 Drawing Sheets

(51) Int. Cl.
*G06F 17/27* (2006.01)
*G06Q 50/00* (2012.01)
(52) U.S. Cl.
CPC ......... *G06Q 30/0246* (2013.01); *G06Q 50/01* (2013.01); *H04L 51/32* (2013.01)

(56) References Cited

U.S. PATENT DOCUMENTS

| | | | | |
|---|---|---|---|---|
| 8,326,684 | B1* | 12/2012 | Halahmi | G06Q 30/04 705/14.4 |
| 8,352,412 | B2* | 1/2013 | Alba | G06Q 30/02 706/55 |
| 8,458,046 | B2* | 6/2013 | Myslinski | G06Q 10/10 705/26.1 |
| 8,468,207 | B1* | 6/2013 | Nandy | H04L 51/12 709/206 |
| 8,775,429 | B2* | 7/2014 | Choudhary | G06Q 50/01 707/738 |
| 8,825,515 | B1* | 9/2014 | Hanson | G06Q 50/01 705/7.32 |
| 8,909,569 | B2* | 12/2014 | Spivack | G06N 5/046 706/12 |
| 9,172,671 | B2* | 10/2015 | Bates | H04L 51/12 |
| 9,177,060 | B1* | 11/2015 | Bennett | G06F 16/951 |
| 9,208,473 | B2* | 12/2015 | Jung | G06Q 50/01 |
| 9,253,138 | B2* | 2/2016 | Bates | H04L 51/12 |
| 9,319,367 | B2* | 4/2016 | Zeng | H04L 51/22 |
| 9,342,844 | B2* | 5/2016 | Reis | G06Q 30/02 |
| 9,356,905 | B2* | 5/2016 | Rasmussen | H04L 51/066 |
| 9,426,239 | B2* | 8/2016 | McCandless | H04L 67/22 |
| 9,519,936 | B2* | 12/2016 | Vijayaraghavan | G06Q 50/01 |
| 9,807,044 | B2* | 10/2017 | Agarwal | H04L 12/1859 |
| 10,021,061 | B1* | 7/2018 | Bastide | H04L 67/2804 |
| 10,110,531 | B2* | 10/2018 | Bastide | H04L 51/12 |
| 10,250,547 | B1* | 4/2019 | Jain | H04L 51/32 |
| 2003/0158872 | A1* | 8/2003 | Adams | H04N 7/16 |
| 2003/0210249 | A1* | 11/2003 | Simske | G06F 17/273 345/581 |
| 2005/0102500 | A1* | 5/2005 | Khangaonkar | H04L 63/02 713/153 |
| 2006/0253537 | A1* | 11/2006 | Thomas | G06Q 10/107 709/206 |
| 2006/0282328 | A1* | 12/2006 | Gerace | G06Q 10/10 705/14.66 |
| 2007/0121843 | A1* | 5/2007 | Atazky | H04L 51/32 379/114.13 |
| 2010/0070335 | A1 | 3/2010 | Parekh et al. | |
| 2011/0093258 | A1* | 4/2011 | Xu | G06F 17/27 704/9 |
| 2011/0202606 | A1* | 8/2011 | Agarwal | H04L 12/1859 709/206 |
| 2011/0314007 | A1* | 12/2011 | Dassa | G06F 16/24578 707/723 |
| 2011/0320542 | A1* | 12/2011 | Bendel | G06F 17/274 709/206 |
| 2012/0158489 | A1* | 6/2012 | Benyamin | G06Q 30/0246 705/14.45 |
| 2012/0272160 | A1* | 10/2012 | Spivack | G06Q 10/10 715/752 |
| 2012/0290662 | A1* | 11/2012 | Weber | G06Q 10/107 709/206 |
| 2013/0110928 | A1* | 5/2013 | Ghosh | G06Q 50/01 709/204 |
| 2014/0025478 | A1* | 1/2014 | Mischuk | G06Q 30/0242 705/14.41 |
| 2014/0088944 | A1* | 3/2014 | Natarajan | G06Q 30/02 703/13 |
| 2014/0101247 | A1* | 4/2014 | Pappas | H04L 67/22 709/204 |
| 2014/0114745 | A1* | 4/2014 | Bruich | G06Q 30/0242 705/14.44 |
| 2014/0114748 | A1* | 4/2014 | Bruich | G06Q 30/0246 705/14.45 |
| 2014/0180788 | A1* | 6/2014 | George | G06Q 30/0269 705/14.41 |
| 2014/0298463 | A1* | 10/2014 | Zheng | G06Q 10/00 726/23 |
| 2014/0330632 | A1* | 11/2014 | Huddleston | G06Q 50/01 705/14.41 |
| 2015/0067849 | A1 | 3/2015 | Agrawal et al. | |
| 2015/0112753 | A1* | 4/2015 | Suvarna | G06Q 30/0201 705/7.29 |
| 2015/0113056 | A1 | 4/2015 | Srinivasan et al. | |
| 2015/0193444 | A1* | 7/2015 | Gardiner | G06F 16/9535 707/726 |
| 2015/0278195 | A1* | 10/2015 | Yang | G06F 17/2785 704/9 |
| 2015/0294216 | A1* | 10/2015 | Baughman | G06F 17/2765 706/11 |
| 2015/0371278 | A1* | 12/2015 | Soni | G06Q 30/0269 705/14.66 |
| 2016/0055235 | A1* | 2/2016 | Zhang | G06F 16/3344 707/749 |
| 2016/0225030 | A1* | 8/2016 | Iyer | G06Q 30/0269 |
| 2016/0359993 | A1* | 12/2016 | Hendrickson | H04L 67/22 |
| 2016/0366080 | A1* | 12/2016 | Bastide | H04L 51/32 |
| 2017/0308927 | A1* | 10/2017 | Woods | G06Q 30/0254 |
| 2018/0018707 | A1* | 1/2018 | Berry, Jr. | G06Q 30/0204 |
| 2018/0063065 | A1* | 3/2018 | Ma | H04L 51/32 |
| 2018/0107747 | A1* | 4/2018 | Bastide | G06Q 50/01 |
| 2018/0324127 | A1* | 11/2018 | Bastide | H04L 51/12 |
| 2018/0330251 | A1* | 11/2018 | Sanchez | G06N 5/04 |
| 2019/0019204 | A1* | 1/2019 | Kopikare | G06Q 30/0203 |
| 2019/0065610 | A1* | 2/2019 | Singh | G06F 17/2785 |

OTHER PUBLICATIONS

Juan Martinez-Romo and Lourdes Araujo. "Detecting malicious tweets in trending topics using a statistical analysis of language", Expert Systems with Applications, vol. 40, Issue 8, Jun. 15, 2013, 9 pages. (Year: 2013).*

Carlos Castillo, Marcelo Mendoza, and Barbara Poblete. "Information Credibility on Twitter", WWW 2011—Session: Information Credibility, Mar. 28-Apr. 1, 2011, Hyderabad, India, 10 pages. (Year: 2011).*

Budak, C. et al., "Limiting the spread of misinformation in social networks," In ACM Proc.of the 20th Int'l. Conf. on World Wide Web, Mar. 28, 2011, pp. 665-674.

Moore, C. et al., "Epidemics and percolation in small-world networks," In Physical Review E, vol. 61, No. 5, May 1, 2000, 6 pg.

Pastor-Satorras, R. et al., "Immunization of complex networks," In Physical Review E, vol. 65, No. 3, Feb. 8, 2002, 9 pg.

* cited by examiner

RESPONDING TO AN ELECTRONIC MESSAGE COMMUNICATED TO A LARGE AUDIENCE

BACKGROUND

The present invention relates to data processing, and more specifically, to electronic messaging.

As use of the Internet continues to proliferate around the world, so too does the use of electronic messaging. Various forms of electronic messaging include electronic mail (e-mail), text messaging, posts in web based forums and posts in social networking services. Using electronic messaging, electronic message content can be widely disseminated to very large numbers of people. For example, a user can share an electronic message with a first set of people. Each person in the first set of people can share the electronic message with another set of people, and so on.

SUMMARY

A method includes identifying a first electronic message comprising first content being widely disseminated. The method also can include analyzing the first content of the first electronic message and determining whether the first content satisfies at least a first criterion. The method also can include, responsive to determining that the first content of the first electronic message satisfies the at least the first criterion, automatically generating, using a processor, a second electronic message comprising second content. The method also can include initiating communication of the second electronic message to a first set of people. The method also can include monitoring responses by the first set of people to the second electronic message. The method also can include determining whether the responses by the first set of people satisfy at least a second criterion. The method also can include, responsive to determining that the responses satisfy at least the second criterion, initiating communication of the second electronic message to at least a second set of people.

A system includes a processor programmed to initiate executable operations. The executable operations include identifying a first electronic message comprising first content being widely disseminated. The executable operations also can include analyzing the first content of the first electronic message and determining whether the first content satisfies at least a first criterion. The executable operations also can include, responsive to determining that the first content of the first electronic message satisfies the at least the first criterion, automatically generating a second electronic message comprising second content. The executable operations also can include initiating communication of the second electronic message to a first set of people. The executable operations also can include monitoring responses by the first set of people to the second electronic message. The executable operations also can include determining whether the responses by the first set of people satisfy at least a second criterion. The executable operations also can include, responsive to determining that the responses satisfy at least the second criterion, initiating communication of the second electronic message to at least a second set of people.

A computer program includes a computer readable storage medium having program code stored thereon. The program code is executable by a processor to perform a method. The method includes identifying, by the processor, a first electronic message comprising first content being widely disseminated. The method also can include analyzing, by the processor, the first content of the first electronic message and determining, by the processor, whether the first content satisfies at least a first criterion. The method also can include, responsive to determining that the first content of the first electronic message satisfies the at least the first criterion, automatically generating, by the processor, a second electronic message comprising second content. The method also can include initiating, by the processor, communication of the second electronic message to a first set of people. The method also can include monitoring, by the processor, responses by the first set of people to the second electronic message. The method also can include determining, by the processor, whether the responses by the first set of people satisfy at least a second criterion. The method also can include, responsive to determining that the responses satisfy at least the second criterion, initiating, by the processor, communication of the second electronic message to at least a second set of people.

DETAILED DESCRIPTION

Figure 1:
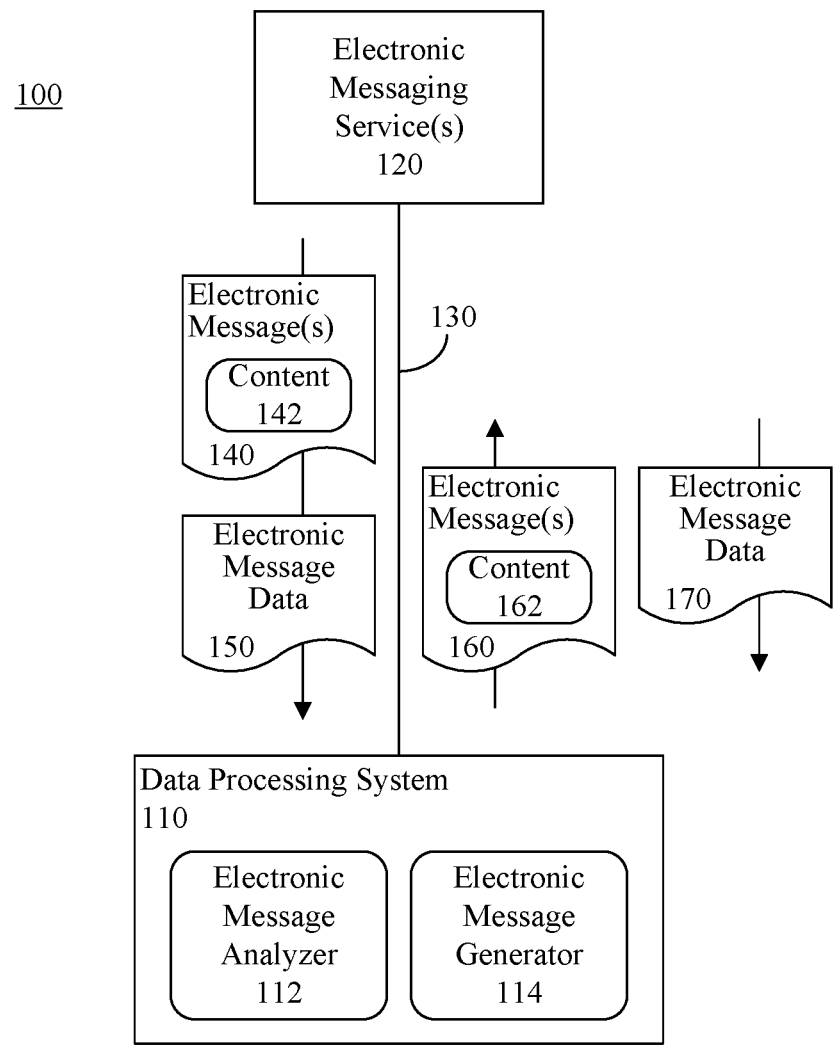
FIG. 1 is a block diagram illustrating an example of a network computing environment.

This disclosure relates to data processing, and more specifically, to electronic messaging. In accordance with the inventive arrangements disclosed herein, an electronic message being widely disseminated can be identified. Content of the electronic message can be analyzed. Based on the analysis, a determination can be made as to whether the content satisfies at least a first criterion. If the content satisfies the at least one criterion, a second electronic message including second content can be automatically generated. Communication of the second electronic message to a first set of people can be initiated. Responses by the first set of people to the second electronic message can be monitored. A determination can be made as to whether the responses satisfy at least a second criterion. If so, the second electronic message can be communicated to at least a second set of people.

Several definitions that apply throughout this document now will be presented.

As defined herein, the term "widely disseminated" means disseminated to at least a threshold number of people.

As used herein, the term electronic message means functional data structure, in the form of a message configured to be communicated via at least one communication network, including content configured to be presented to people. Examples of an electronic message include an electronic mail (e-mail), a text message, a post in a social networking system, and a post in a web based forum.

As defined herein, the term "e-mail" means an electronic mail delivered via a communication network to at least one user. An e-mail may be sent by one user to one or more other users. In this regard, an e-mail typically identifies at least recipient using a user name (e.g., e-mail address) corresponding to the recipient, or a group name corresponding to a group of recipients, in at least field within the e-mail, for example within a "To" field, "Cc" field and/or "Bcc" field in a header of the e-mail. A recipient may view an e-mail via an e-mail client, which may execute on a client device or a server to which a client device is communicatively linked.

As defined herein, the term "text message" means an electronic message comprising text delivered via a communication network to at least one user identified as a recipient. A text message may be sent by one user to one or more other users. In this regard, a text message typically identifies at least one recipient using a user name, user identifier, telephone number or the like. A text message also may comprise audio, image and/or multimedia content. A text message can be delivered, for example, using the short message service (SMS), the text messaging service (TMS) and/or the multimedia messaging service (MMS). A text message also may be referred to as an "instant message." As defined herein, a text message itself is not a result generated by an Internet search engine per se, although a text message may contain one or more uniform resource identifiers, such as hyperlinks, which can be generated by an Internet search engine and copied, for example by a user (e.g., sender), into the text message. In this regard, if a user uses a web browser to access an Internet search engine to perform an Internet search, and the user receives results from the Internet search engine in the web browser, such results are not a text message as the term text message is defined herein.

As defined herein, the term "social networking service" means an online service platform on which social networks or social relations are built among people who, for example, share interests, activities, backgrounds or real-life connections, and via which people can share information with one another. People can hold conversations in a social networking service by posting messages. As the term "social networking service" is defined herein, a messaging service per se (e.g., an e-mail service, a text messaging service, or an instant messaging service) is not a social networking service, though a social networking service can include an e-mail messaging service, a text messaging service and/or an instant messaging service in addition to one or more social networking components.

As defined herein, the term "web based forum" means is an online discussion site where people can post messages that are viewable by other people. For example, people can hold conversations in a web based forum by posting messages. Some messages posted in a web based forum may be responses to other posted messages, or ask questions related to other posted messages. As the term "web based forum" is defined herein, a messaging service per se (e.g., an e-mail service, a text messaging service, or an instant messaging service) is not a web based forum, though a web based forum can include an e-mail messaging service, a text messaging service and/or an instant messaging service in addition to one or more web based forum components.

As defined herein, the term "post" means to enter a message in a thread of a social networking service or a web based forum. A new thread can be created in which to enter the message, or the message can be entered into an existing thread.

As defined herein, the term "natural language analysis" means a process that derives a computer understandable meaning of a human language.

As defined herein, the term "human language" is a language spoken or written by human beings that is not a computer programming language. A "human language" may be referred to as a "natural language."

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a network computing environment 100. The computing environment can include a data processing system 110, including at least one processor and memory, communicatively linked to one or more electronic messaging services 120 via at least one communication network 130. Examples of the electronic messaging services 120 include, but are not limited to, e-mail services, text messaging services, social networking services and services that host web based forums. The electronic messaging services 120 can be hosted by one or more respective data processing systems (not shown).

The communication network 130 is the medium used to provide communications links between various devices and data processing systems connected together within the network computing environment 100. The communication network 130 may include connections, such as wire, wireless communication links, or fiber optic cables. The communication network 130 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

The data processing system 110 can monitor the electronic messaging services 120 and identify electronic messages 140 that are widely disseminated. For example, the data processing system 110 can identify electronic messages 140 that are disseminated to a number of people exceeding a threshold value. The threshold value can be 100, 500, 1,000, 5,000, 10,000 and so on. In addition, the data processing system 110 can monitor responses to the electronic messages 140, forwarding of the electronic messages 140, re-posting of the electronic messages 140, etc. In illustration, monitoring agents and/or application programming interfaces (APIs) can execute on processing systems hosting the electronic messaging services 120. Such monitoring agents and/or APIs can be configured to monitor the number of people to whom the electronic messages 140 are disseminated, monitor responses to the electronic messages 140, monitoring sharing of the electronic messages 140, monitor forwarding of the electronic messages 140, and so on. Further, the monitoring agents and/or APIs can be configured to communicate corresponding electronic message data 150 to the data processing system 110. For example, the monitoring agents and/or APIs can communicate to the data processing system 110 at least one instance of each electronic message 140, and electronic message data 150. The electronic message data can indicate to whom and when the electronic message 140 is disseminated, social groups in which such people are members, comments made by people responding to, forwarding or sharing the electronic message 140, etc. In another arrangement, one or more of the electronic messaging services 120 can be include services configured to gather the electronic message data 150 and communicate the electronic message 140 and electronic message data 150 to the data processing system 110.

The data processing system 110 can include an electronic message analyzer 112. The electronic message analyzer 112 can analyze, in real time, the electronic message data 150 to determine whether a number of people to whom the electronic message 140 is disseminated exceed a threshold value, and identify to whom the electronic message 140 is disseminated. Further, the electronic message analyzer 112 can identify, in real time, the content 142, and analyze the content in real time to determine a subject of the content 142 and/or a sentiment of the content 142. If the content 142 includes audio, video and/or still images, the electronic message analyzer 112 can perform speech recognition on the audio and/or perform image recognition on the video and/or still images. Based on text generated by the speech recognition and/or results of the image recognition, the electronic message analyzer 112 can determine a subject of the content 142 and/or a sentiment of the content 142. The electronic message analyzer 112 also can determine, in real time, a sentiment of comments made by people responding to, forwarding or sharing the electronic message 140, for example by analyzing text and/or audio of such comments.

To determine sentiment of the content 142 and the comments, the electronic message analyzer 112 can implement, in real time, natural language processing and semantic analysis. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the electronic message analyzer 112 to implement NLP and semantic analysis.

Further, the electronic message analyzer 112 can implement, in real time, cognitive processing, which also is known in the art, on data generated by the NLP and semantic analysis. Based on the cognitive processing, the electronic message analyzer 112 can determine whether the sentiments expressed in the content 142 and/or comments should be addressed. For example, the electronic message analyzer 112 can determine whether key terms and phrases in the content 142 and/or comments, and sentiment expressed by those key terms and phrases, are contained in a database of sensitive terms, phrases or sentiment. Based on such analysis, the electronic message analyzer 112 can determine whether the content 142 of the electronic message 140 and/or the comments regarding the electronic message 140 satisfy at least one criterion.

In another arrangement, the electronic message analyzer 112 can interface with another system (not shown) that implements cognitive processing. For example, the electronic message analyzer 112 can communicate, in real time, the electronic message data 150 and the content 142, or results of the NLP and semantic analysis, to a cognitive system, for instance IBM Watson™. The cognitive system can analyze the electronic message data 150 and the content 142, or results of the NLP and semantic analysis, and return, in real time, to the electronic message analyzer 112 results of such analysis. Again, based on the results of such analysis, the electronic message analyzer 112 can determine whether the content 142 of the electronic message 140 and/or the comments regarding the electronic message 140 satisfy at least one criterion.

Responsive to the content 142 (e.g., a particular subject and/or sentiment of the content 142) and/or the comments regarding the electronic message 140 satisfying at least one criterion, or the electronic message 140 originating from a particular entity, the electronic message analyzer 112 can determine, in real time, whether an electronic message 160 including content 162 should be disseminated to various people. For example, the electronic message analyzer 112 can determine whether the electronic message 160 should be disseminated to clarify the content 142 of the electronic message 140, to refute the content 142, to rebut the content 142 and/or to present another perspective on the content 142. In illustration, the electronic message 160 can be a counter message including content 162 that refutes, rebuts and/or presents another perspective on the content 142. The electronic message analyzer 112 can interface with an electronic message generator 114 of the data processing system 110 to automatically generate, in real time, the electronic message 160. The electronic message generator 114 can disseminate, in real time, the electronic message 160, including the content 162, to people indicated by the electronic message analyzer 112. For example, the electronic message generator 114 can posts the electronic message 160 to one or more social networking services and/or web based forums in a manner that shares the electronic message 160 with the indicated people as a post, communicate the electronic message 160 to such people as an e-mail and/or communicate the electronic message to such people as a text message.

In one arrangement, the electronic message analyzer 112 can automatically select, in real time, the content 162 from a database based on results of the NLP, semantic analysis and/or cognitive analysis, or automatically generate, in real time, the content 162 based on such results. For example, the electronic message analyzer 112 can implement cognitive processing to select and/or generate the content 162. In another arrangement, the electronic message analyzer 112 can interface with a cognitive system, such as IBM Watson™, to generate or select the content 162 in real time.

In a further arrangement, responsive to the content 142 of the electronic message 140 and/or the comments regarding the electronic message 140 satisfying at least one criterion, the electronic message analyzer 112 can generate, in real time, a notification to a user of the data processing system 110 regarding the electronic message 140, the content 142 of the electronic message 140 and results of the above analyses.

Such user can choose to generate and disseminate the electronic message 160 with the content 162. In this regard, the user can select or generate the content 162 for the electronic message 160.

Figure 2:
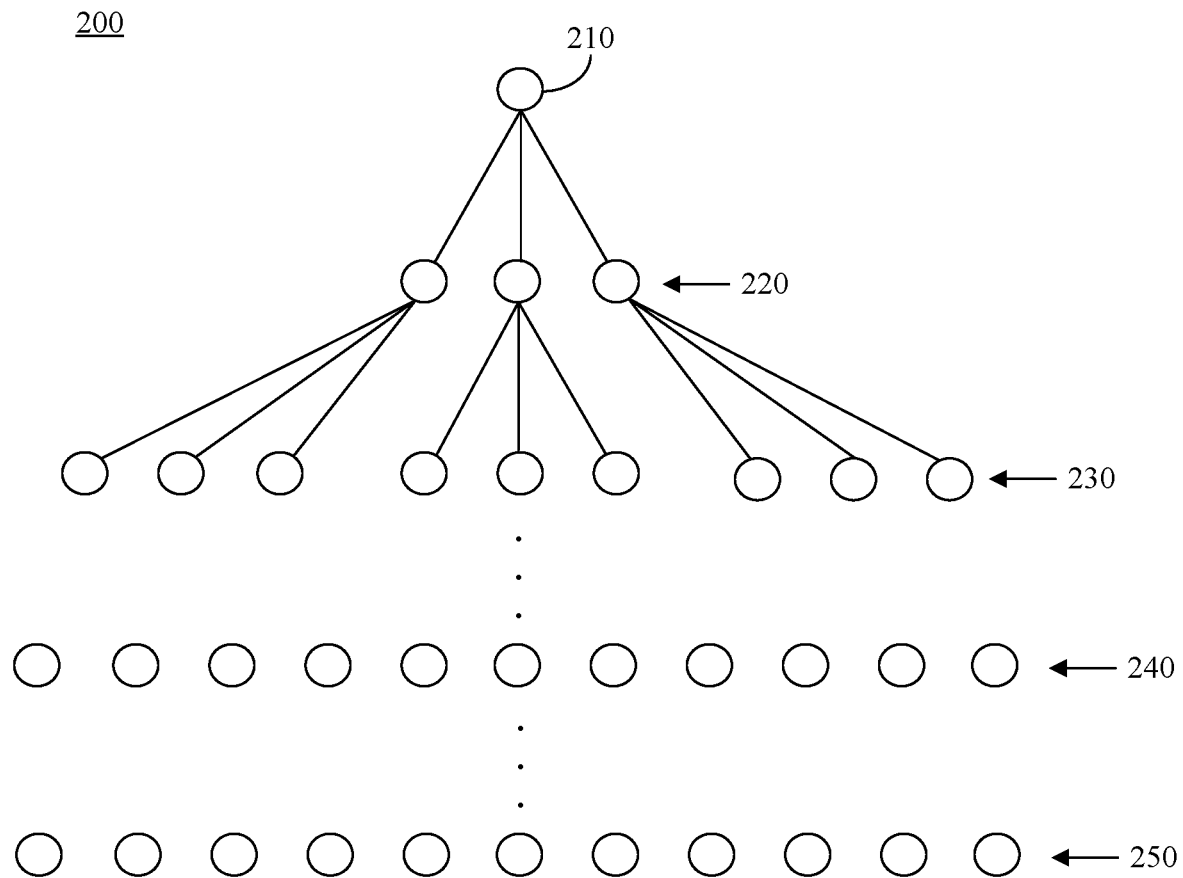
FIG. 2 is a social connection diagram illustrating an example of electronic message propagation.

FIG. 2 is a social connection diagram 200 illustrating an example of electronic message propagation. The social connection diagram 200 can indicate a likely propagation of the electronic message 140 from an originator 210 of the electronic message 140 to various sets of people 220, 230, 240, 250. The originator 210 can be an entity, such as a person or organization, who initially generates and/or communicates the electronic message 140.

Referring to FIGS. 1 and 2, the electronic message analyzer 112 can choose, in real time, a first set of people whom to initially communicate the electronic message 160 via the electronic messaging service(s) 120 (e.g., share the electronic message 160 as one or more posts or communicate electronic message 160 via e-mail or text messaging). For example, based on the electronic message data 150, the electronic message analyzer 112 can identify the originator 210 of the electronic message 140, those people 220 to whom the electronic message 140 is originally disseminated, people 230 with whom the people 220 shared the electronic message 140 (e.g., as posts in one or more social networking services or web based forums, as communicated e-mails, text messages, etc.), and so on. Further, the electronic message analyzer 112 can identify those people 240, 250 with whom the electronic message 140 has not yet been communicated, but to whom the electronic message 140 may be communicated. For example, the electronic message analyzer 112 can analyze social connections of the people 230 to identify people 240 to whom the people 230 are socially connected, but have not yet received the electronic message 140, and people 250 with whom the people 240 are socially connected. The electronic message analyzer 112 can choose the people 240 to include in an initial set of people to whom to communicate the electronic message 160 via the electronic messaging service(s) 120. Moreover, the electronic message analyzer 112 can initiate the electronic message 160 to be communicated to the people 240, in real time, prior to at least a majority of the people 240 receiving the electronic message 140. Accordingly, the people 240 can receive the content 162 prior to receiving the content 142.

In one arrangement, the electronic message analyzer 112 can analyze the electronic message data 150, and based on the electronic message data 150, determine a rate at which the electronic message 140 has been disseminated to the people 220, 230. Based on that rate, the electronic message analyzer 112 can predict a rate at which the electronic message 140 will be disseminated to the people 240, 250. If the electronic message analyzer 112 determines that the electronic message 140 will be disseminated to the people 240 prior to the electronic message 160 being communicated to the people 240, rather than initially communicating the electronic message 160 to the people 240, the electronic message analyzer 112 can initiate the electronic message generator 114 to initially communicate the electronic message 160 to the people 250.

In another arrangement, the electronic message analyzer 112 can predict a time when the content 162 will elicit responses by the set of people 240 that satisfy at least one criterion. For example, if the content 162 is a refute of, rebuttal to, or clarification of the content 142, or presents another perspective, the at least one criterion can be that the responses support, or otherwise agree with, the content 162. The electronic message analyzer 112 can determine that the time to communicate the electronic message 160 to the people 240 to elicit the responses is a time when, or near to a time when, the electronic message analyzer 112 predicts the people 240 likely will receive the electronic message 140. For example, the electronic message analyzer 112 can initiate the electronic message generator 114 to communicate the electronic message 160 to the set of people 240 at a time, anticipated by the electronic message analyzer 112, when the people 240 are predicted to begin receiving the electronic message 140, at a time within a threshold period before the anticipated time, or at a time within a threshold period after the anticipated time.

In one aspect of the present arrangements, the people included in the set of people 240 can be selected by the electronic message analyzer 112. For example, the electronic message analyzer 112 can identify key people who will share the electronic message 160 with a plurality of other people 220, 230, 250, and include those key people in the set of people 240. The electronic message analyzer 112 can identify the key people based on historical message sharing data maintained by the data processing system 110 and/or received from one or more of the electronic messaging services 120.

In the following example, assume that the electronic message generator 114 initially communicates the electronic message 160 the set of people 240. The electronic messaging service(s) 120 can generate electronic message data 170 in a manner similar to that described for the electronic message data 150, and communicate the electronic message data 170 to the electronic message analyzer 112. The electronic message data 170 can indicate to whom and when the electronic message 160 is disseminated by the people 240 to other people 220, 230, 250, comments made by the people 240 responding to, forwarding or sharing the electronic message 140, etc. The electronic message analyzer 112 can analyze the electronic message data 170 to determine a sentiment of the people 240 toward the content 162. For example, the electronic message analyzer 112 can perform NLP, semantic analysis and/or cognitive analysis, and/or interface with a cognitive system to perform at least a portion of the analysis, as previously described.

Based on the sentiment of the people 240 toward the content 162, the electronic message analyzer 112 can determine whether the comments (e.g., at least a portion of the comments) satisfy at least one criterion. For example, the electronic message analyzer 112 can determine whether the sentiments expressed in the comments reflect favorably on the content 162. If so, the electronic message analyzer 112 can initiate the electronic message generator 114 to disseminate the electronic message 160 to at least a second set of people, for example the people 250. If the comments do not satisfy the at least one criterion, the electronic message analyzer 112 can automatically revise the content 162 based on the comments, or select new content based on the comments, and initiate the electronic message generator 114 to send a new electronic message (not shown) including the revised or new content to at least the second set of people 250.

Figure 3:
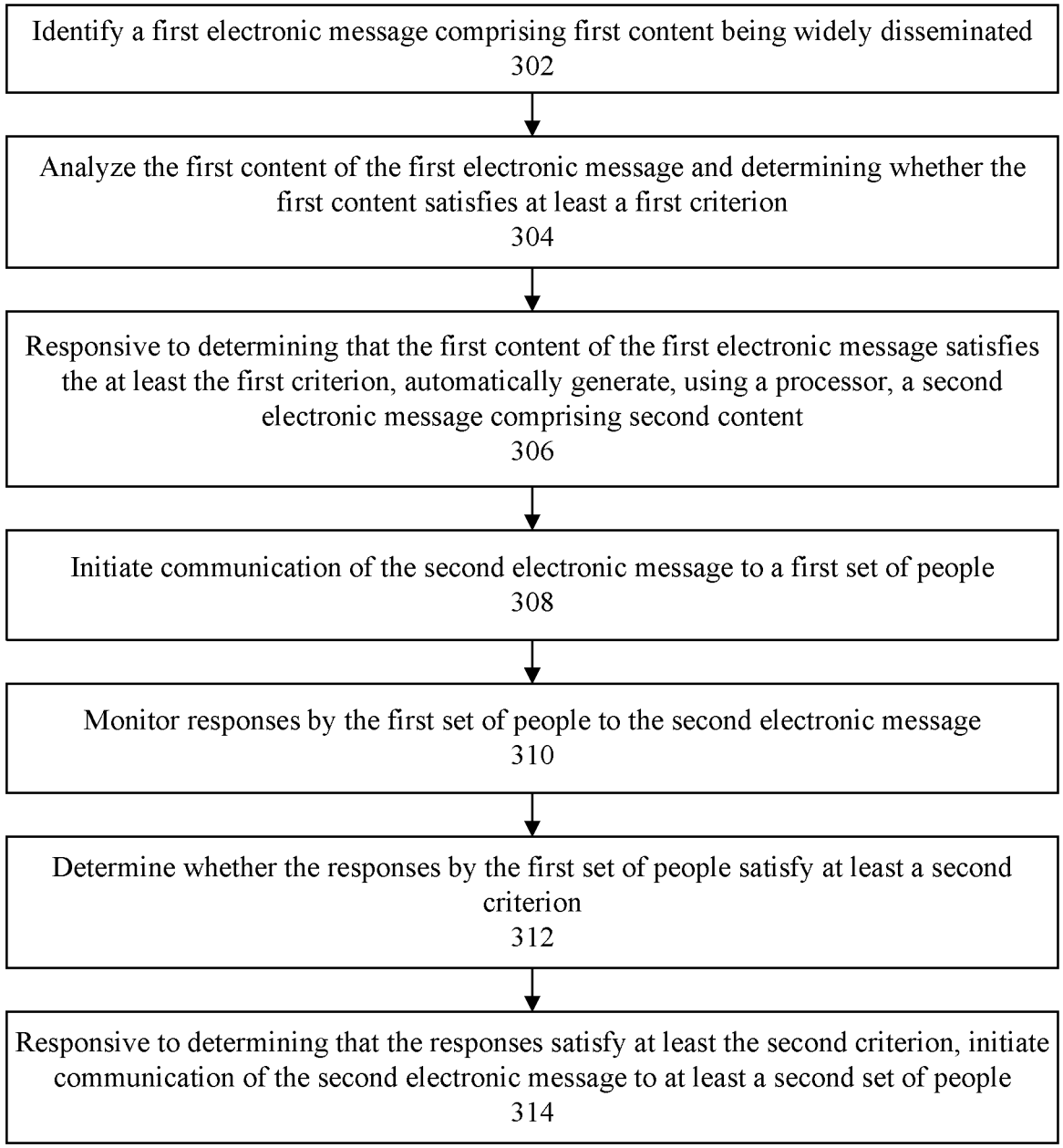
FIG. 3 is a flow chart illustrating an example of a method of initiating communication of an electronic message.

FIG. 3 is a flow chart illustrating an example of a method 300 of initiating communication of an electronic message. The method can be implemented by the data processing system 110 of FIG. 1.

At step 302, the data processing system 110 can identify a first electronic message comprising first content being widely disseminated. At step 304, the data processing system 110 can analyze the first content of the first electronic message and determining whether the first content satisfies at least a first criterion. At step 306, the data processing system 110 can, responsive to determining that the first content of the first electronic message satisfies the at least the first criterion, automatically generate, using a processor, a second electronic message comprising second content. At step 308, the data processing system 110 can initiate communication of the second electronic message to a first set of people. At step 310, the data processing system 110 can monitor responses by the first set of people to the second electronic message. At step 312, the data processing system 110 can determine whether the responses by the first set of people satisfy at least a second criterion. At step 314, the data processing system 110 can, responsive to determining that the responses satisfy at least the second criterion, initiate communication of the second electronic message to at least a second set of people.

Figure 4:
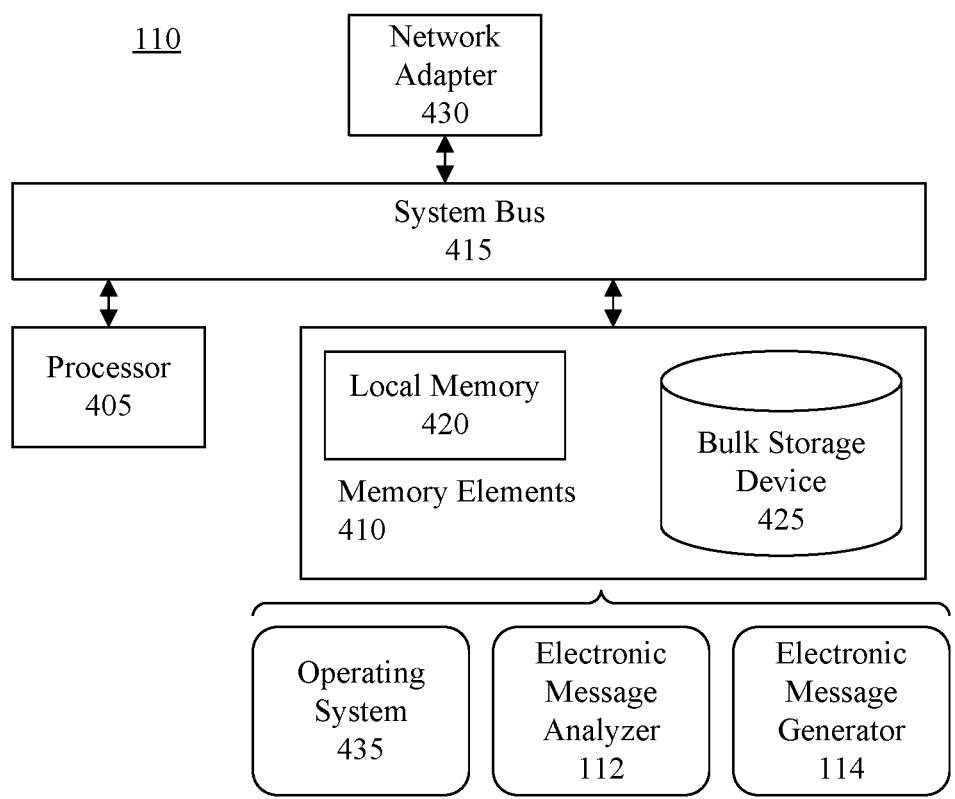
FIG. 4 is a block diagram illustrating example architecture for a processing system.

FIG. 4 is a block diagram illustrating example architecture for the data processing system 110. The data processing system 110 can include at least one processor 405 (e.g., a central processing unit) coupled to memory elements 410 through a system bus 415 or other suitable circuitry. As such, the data processing system 110 can store program code within the memory elements 410. The processor 405 can execute the program code accessed from the memory elements 410 via the system bus 415. It should be appreciated that the data processing system 110 can be implemented in the form of any system including a processor and memory that is capable of performing the functions and/or operations described within this specification. For example, the data processing system 110 can be implemented as a server, a plurality of communicatively linked servers, a workstation, and so on.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The data processing system 110 also can include one or more cache memories (not shown) that provide temporary storage of at least some program code in order to reduce the number of times program code must be retrieved from the bulk storage device 425 during execution.

One or more network adapters 430 can be coupled to data processing system 110 to enable the data processing system 110 to become coupled to other systems, computer systems, remote printers, and/or remote storage devices through intervening private or public networks. Modems, cable modems, transceivers, and Ethernet cards are examples of different types of network adapters 430 that can be used with the data processing system 110.

As pictured in FIG. 4, the memory elements 410 can store the components of the data processing system 110, namely an operating system 435, the electronic message analyzer 112 and the electronic message generator 114. Being implemented in the form of executable program code, these components of the data processing system 110 can be executed by the data processing system 110 and, as such, can be considered part of the data processing system 110. Moreover, the electronic messages 140 received by, and the electronic messages 160 generated by, the data processing system 110 are functional data structures that impart functionality when employed as part of the data processing system 110.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor programmed to initiate executable operations comprising:
identifying a first electronic message being disseminated to a plurality of recipients, the first electronic message comprising first content;
receiving, from each of a plurality of data processing systems, each of the plurality of data processing systems hosting a respective electronic messaging service, electronic message data pertaining to the first electronic message;
communicating the electronic message data pertaining to the first electronic message and the first content to a cognitive system that implements cognitive processing, wherein the cognitive system analyzes the data pertaining to the first electronic message and the first content and returns results based on analyzing the electronic message data and analyzing the first content;
based on the results of the analyzing the first content, determining, by the processor, whether the first content satisfies at least a first criterion;
responsive to determining that the first content of the first electronic message satisfies at least the first criterion, automatically generating, by the processor, a second electronic message comprising second content;
initiating, by the processor, communication of the second electronic message to a first set of people;
monitoring, by the processor, responses by the first set of people to the second electronic message;
determining, by the processor, whether the responses by the first set of people satisfy at least a second criterion; and
responsive to determining that the responses satisfy at least the second criterion, initiating, by the processor, communication of the second electronic message to at least a second set of people.

2. The system of claim 1, the executable operations further comprising:
predicting a time when the second content likely will elicit the responses by the first set of people that satisfy at least the second criterion;
wherein communication of the second electronic message to at least the first set of people is initiated at the predicted time.

3. The system of claim 1, the executable operations further comprising:
identifying the first set of people based on their social connections to people to whom the first electronic message has been disseminated, wherein the first set of people are people who did not receive the first electronic message.

4. The system of claim 1, the executable operations further comprising:
identifying the first set of people based on how quickly the first electronic message has been disseminated.

5. The system of claim 1, the executable operations further comprising:
identifying key people who historically have shared a previous electronic message as key people who will share the second electronic message with a plurality of other people;
wherein the first set of people include the identified key people.

6. The system of claim 1, wherein determining whether the responses by the first set of people satisfy at least the second criterion comprises determining a sentiment of the responses.

7. The system of claim 1, wherein determining whether the first content satisfies the at least one defined criterion comprises determining whether the first content was generated by a particular entity.

8. The system of claim 1, wherein each of the plurality of data processing systems execute a respective monitoring agent, and the electronic message data pertaining to the first electronic message is received from the monitoring agent.

9. The system of claim 1, wherein each of the plurality of data processing systems execute a respective application programming interface, and the electronic message data pertaining to the first electronic message is received from the application programming interface.

10. The system of claim 1, wherein the electronic message data pertaining to the first electronic message indicates people to whom the first electronic message is disseminated, when the first electronic message is disseminated, social groups in which the people to whom the electronic message is disseminated are members, and comments made by the people responding to, forwarding or sharing the electronic message.

11. A computer program product comprising a computer readable storage medium having program code stored thereon, wherein the computer readable storage medium is not a transitory, propagating signal per se, the program code executable by a processor to perform a method comprising:
identifying, by the processor, a first electronic message being disseminated to a plurality of recipients, the first electronic message comprising first content;
receiving, by the processor, from each of a plurality of data processing systems, each of the plurality of data processing systems hosting a respective electronic messaging service, electronic message data pertaining to the first electronic message;
communicating, by the processor, the electronic message data pertaining to the first electronic message and the first content to a cognitive system that implements cognitive processing, wherein the cognitive system analyzes the data pertaining to the first electronic message and the first content and returns results based on analyzing the electronic message data and analyzing the first content;
based on the results of the analyzing the first content, determining, by the processor, whether the first content satisfies at least a first criterion;
responsive to determining that the first content of the first electronic message satisfies at least the first criterion, automatically generating, by the processor, a second electronic message comprising second content;
initiating, by the processor, communication of the second electronic message to a first set of people;
monitoring, by the processor, responses by the first set of people to the second electronic message;
determining, by the processor, whether the responses by the first set of people satisfy at least a second criterion; and
responsive to determining that the responses satisfy at least the second criterion, initiating, by the processor, communication of the second electronic message to at least a second set of people.

12. The computer program product of claim 11, the method further comprising:

predicting a time when the second content likely will elicit the responses by the first set of people that satisfy at least the second criterion;

wherein communication of the second electronic message to at least the first set of people is initiated at the predicted time.

13. The computer program product of claim 11, the method further comprising:

identifying the first set of people based on their social connections to people to whom the first electronic message has been disseminated, wherein the first set of people are people who did not receive the first electronic message.

14. The computer program product of claim 11, the method further comprising:

identifying the first set of people based on how quickly the first electronic message has been disseminated.

15. The computer program product of claim 11, the method further comprising:

identifying key people who historically have shared a previous electronic message as key people who will share the second electronic message with a plurality of other people;

wherein the first set of people include the identified key people.

16. The computer program product of claim 11, wherein determining whether the responses by the first set of people satisfy at least the second criterion comprises determining a sentiment of the responses.

17. The computer program product of claim 11, wherein determining whether the first content satisfies the at least one defined criterion comprises determining whether the first content was generated by a particular entity.

18. The computer program product of claim 11, wherein each of the plurality of data processing systems execute a respective monitoring agent, and the electronic message data pertaining to the first electronic message is received from the monitoring agent.

19. The computer program product of claim 11, wherein each of the plurality of data processing systems execute a respective application programming interface, and the electronic message data pertaining to the first electronic message is received from the application programming interface.

20. The computer program product of claim 11, wherein the electronic message data pertaining to the first electronic message indicates people to whom the first electronic message is disseminated, when the first electronic message is disseminated, social groups in which the people to whom the electronic message is disseminated are members, and comments made by the people responding to, forwarding or sharing the electronic message.

* * * * *